(12) United States Patent
Bergmann

(10) Patent No.: US 6,173,092 B1
(45) Date of Patent: Jan. 9, 2001

(54) OPTICAL MIRROR SWITCH UTILIZING WALK-OFF DEVICES

(75) Inventor: Ernest Eisenhardt Bergmann, Fountain Hill, PA (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/287,155

(22) Filed: Apr. 6, 1999

(51) Int. Cl.[7] .................................................. G02B 6/26
(52) U.S. Cl. ........................... 385/16; 385/18; 385/11; 385/31; 359/117; 359/156; 359/485
(58) Field of Search .......................... 385/11, 16, 18–23, 385/31; 372/703; 359/117, 122, 156, 251, 303, 485, 487, 489, 618, 627, 629, 128

(56) References Cited

U.S. PATENT DOCUMENTS

| | | | |
|---|---|---|---|
| 5,724,165 | * | 3/1998 | Wu ........................................ 359/117 |
| 5,930,028 | * | 7/1999 | Bergmann ............................. 359/303 |
| 5,974,205 | * | 10/1999 | Chang ...................................... 385/11 |
| 6,097,518 | * | 8/2000 | Wu et al. ............................... 359/128 |

OTHER PUBLICATIONS

Bob Wang and Mike Ward "Photoelastic Modulators" Cahners Lasers & Optronics—vol. 18, No. 3, Mar. 1999.

* cited by examiner

*Primary Examiner*—Hemang Sanghavi
(74) *Attorney, Agent, or Firm*—Wendy W. Koba, Esq.

(57) ABSTRACT

An optical mirror switch is formed by utilizing a pair of walk-off devices separated by a polarization switch. A first signal port is coupled to the first walk-off device and a second signal port is coupled to the second walk-off device. A reflective surface is also disposed beyond the output of the second walk-off device. In a first, "pass through" state of the switch, an optical signal applied as an input at the first signal port will propagate through the switch and exit at the second signal port. In a second, "reflective" state of the switch, an optical signal applied as an input at the first signal port will propagate through the switch, impinge the reflective surface and be re-directed back through the switch and exit through the first port. The "state" of the switch is controlled by the "state" of the polarization switch (which either exchanges the polarization states of the orthogonal components passing through, or maintains them). A second reflective surface may be added at the input of the first walk-off device to form a "complete" switch.

8 Claims, 4 Drawing Sheets

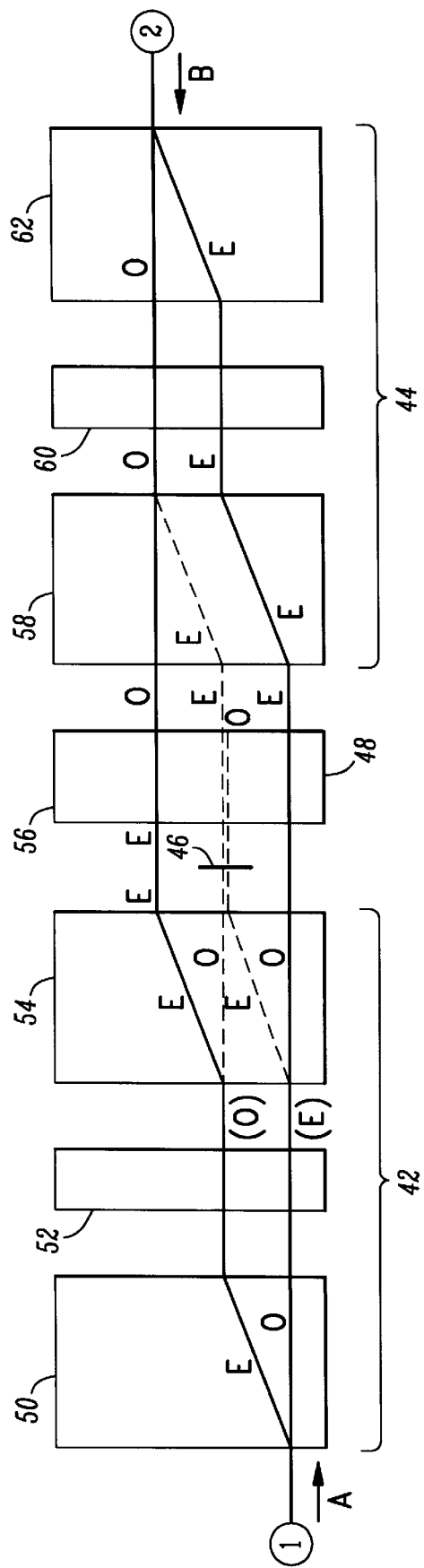
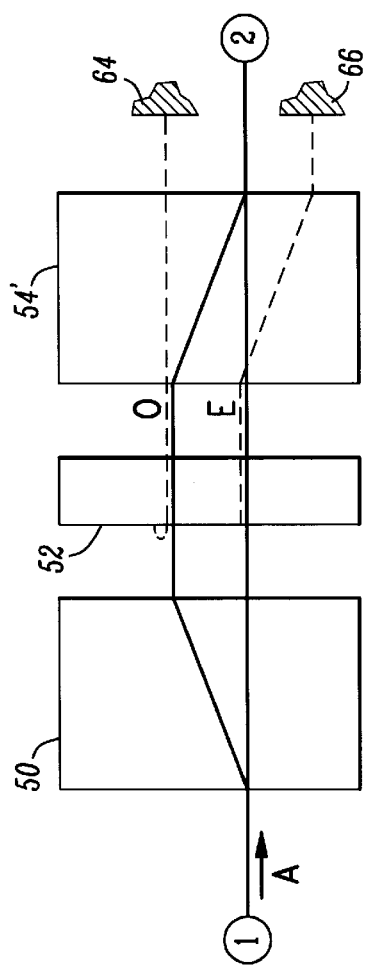
FIG. 3
FIG. 4

POLARIZATION UNAFFECTED

POLARIZATION UNAFFECTED

POLARIZATION INTERCHANGED

POLARIZATION INTERCHANGED

POLARIZATION UNAFFECTED

POLARIZATION UNAFFECTED

POLARIZATION INTERCHANGED

POLARIZATION INTERCHANGED

OPTICAL MIRROR SWITCH UTILIZING WALK-OFF DEVICES

TECHNICAL FIELD

The present invention relates to an optical mirror switch and, more particularly, to a relatively compact mirror switch arrangement utilizing optical walk-off devices.

BACKGROUND OF THE INVENTION

Conventional electro-optical switches can be realized using a number of different waveguide, electrode and substrate orientations. Two different designs are used in commercially available electro-optical switches; the Mach-Zehnder and the $\Delta\beta$ directional coupler. The Mach-Zehnder interferometer utilizes two 3-dB directional couplers, where the first 3-dB coupler splits the incident signal into two signals, ideally of equal intensity. If a differential phase shift is introduced between these signals, then when they re-combine in the second 3-dB coupler, the ratio of power in the two outputs will be altered. Contrast ratios greater than 20dB (e.g., 100:1) are routinely achieved in commercial devices. In the $\Delta\beta$ directional coupler switch, electrodes are placed directly over the coupler and an applied electric field functions to alter the power transfer between the two adjacent waveguides. The contrast ratios achieved with the $\Delta\beta$ directional coupler switch are comparable to those of the 3-dB coupler arrangement.

A "mirror" switch can be defined as an arrangement including a pair of bidirectional ports. In a first state of the mirror switch, the ports are directly coupled together (a "pass through" state). In a second state (hereinafter referred to as the "reflective" state), the ports are de-coupled so that an input signal is directly reflected and then returned back through the same port, that is, an optical signal input into a first port would be reflected back into that first port and, possibly, an optical signal input into the second port would be reflected back into the second port. If the second port is reflected back to itself also, the mirror switch is defined as "complete"; if the second port is not reflected back to itself, the mirror switch is "incomplete".

The successful design of optical apparatus frequently depends upon selection of materials having appropriate physical characteristics such as refractive index. Birefringent materials; that is, materials in which different polarizations have different refractive indices, have been known for a long time and have been used in optical apparatus. An important class of birefringent materials is formed by uniaxial materials; that is, materials with a single optic axis. As is well know, there is no birefringence for light rays parallel to the optic axis. In fact, such birefringent materials exist in nature with calcite probably being the best known. Many people have observed the double image that results when a piece of calcite is placed over an object. This is understood by considering a parallelepiped solid formed of a uniaxial birefringent material and a light beam perpendicularly incident on one surface of the material. One polarization forms the ordinary ray (the "O" ray) which is refracted in a manner that is independent of the orientation of the optic axis at the surfaces; this ray passes directly through the solid as if the solid were isotropic. The other polarization forms the extraordinary ray (the "E" ray) which is refracted in a manner dependent upon the relative orientation of the optic axis at the surfaces and the incident ray direction; the extraordinary ray emerges from the solid parallel to the ordinary ray but spatially displaced from it. Thus, there are two separate images at the output.

Although the double image observed when calcite is placed over an object is probably most used as a laboratory demonstration in elementary science courses, birefringence is now widely used in certain types of optical devices. Because one beam moves away spatially from the other beam, the devices are commonly referred to as "walk-off" devices. The spatial separation of the beams increases linearly as the beams pass through the birefringent material. The subsequent, independent separate processing of the beams is most easily performed if the spatial separation of the beams is large. However, large separation of the beams requires a long piece of birefringent material.

It is noted that the term "walk-off" is not used to describe beam splitters; these devices only use reflection to obtain spatial separation and spatial redirection of beams. Birefringent based devices are typically effective over a broader band of wavelengths than are beam splitters and produce better polarization discrimination than do beam splitters. Conversely, walk-off devices can be used to overlay parallel beams of orthogonal polarizations into a single beam of both polarizations.

SUMMARY OF THE INVENTION

The present invention relates to an optical mirror switch and, more particularly, to a relatively compact mirror switch arrangement utilizing optical walk-off devices. In accordance with a first exemplary embodiment of the present invention, an optical mirror switch (an exemplary "one-way", or "incomplete" device) comprises a pair of walk-off devices with a polarization switch disposed therebetween. A reflective surface is disposed beyond the output of the second walk-off device and used to form the "reflective" state of the optical mirror switch. In operation, an optical signal is applied as an input to the first walk-off device, which functions to produce a spatial separation between the O and E rays of the signal (i.e., the E ray "walks off" with respect to the O ray). The separate rays are then applied as inputs to the polarization switch. In a first state of the polarization switch, the rays maintain their respective polarization states. In a second state of the polarization switch, the rays exchange polarization states such that the O ray is converted to an E ray and, likewise, the E ray is converted to an O ray. As these rays enter the second walk-off device, their respective polarization states will dictate as to whether the rays will converge and form the "pass through" output of the switch (associated with the polarization switch performing an exchange of polarizations), or "walk off" again, impinge upon the external reflective surfaces and be passed back through both walk-off devices and the polarization switch to be coupled back into the original input port ("reflective" state).

In a complete, "two-way" embodiment of the present invention, a second reflective surface is disposed at the "input" side of the first walk-off device so that an optical signal applied as an input to the second walk-off device will either "pass through" to the port associated with the first walk-off device, or be reflected by the second reflective surface disposed at the input side of the first walk-off device and be reflected back to the second signal port.

An alternative embodiment of the present invention utilizes a pair of "cascaded" optical mirror switches, with a reflective surface and polarization interchanger disposed therebetween to form a two-stage optical mirror switch. This alternative embodiment reduces the number of required mirror surfaces that are used for the complete, "two-way" embodiment mentioned above.

Other and further arrangements and features of the present invention will become apparent during the course of the following discussion and by reference to the accompanying drawings.

BRIEF DESCRIPTION OF THE DRAWINGS

Referring to the drawings,

FIG. 3 illustrates a two-stage complete optical mirror switch arrangement using a pair of cascaded switches as shown in FIG. 1, including a single mirror element and polarization interchanger disposed between the pair of cascaded devices;

FIG. 4 illustrates an alternative stage for an incomplete optical mirror switch where the second walk-off device of a pair of walk-off devices is inverted with respect to the first

DETAILED DESCRIPTION

Figure 1:
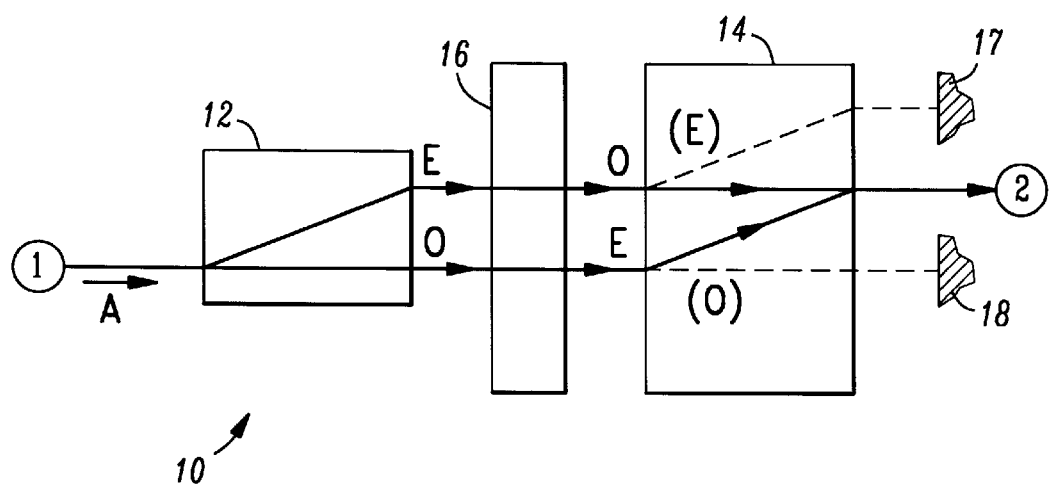
FIG. 1 illustrates an exemplary optical mirror switch using a pair of walk-off devices formed in accordance with the present invention, the illustrated embodiment being an incomplete mirror switch.

An exemplary incomplete optical mirror switch 10 of the present invention is illustrated in FIG. 1. Switch 10 comprises a pair of walk-off devices 12 and 14, with a polarization switch 16 disposed therebetween. A first optical signal port 1 is coupled as an input to first walk-off device 12 and a second optical signal port 2 is coupled as an output to second walk-off device 14. As mentioned above, a "walk-off" device functions to "split" an input optical signal, denoted as input signal A at port 1 of switch 10, into orthogonally polarized rays, referred to as the "ordinary ray" and the "extraordinary ray" and denoted by the letters "O" and "E" in FIG. 1. As the O and E rays traverse the length of first walk-off device 12, they will continue to separate ("walk off"), with the O ray unaffected by the birefringent nature of walk-off device and pass essentially unimpeded according to Snell's law of diffraction) through device 12. In contrast, the E ray is affected by the birefringence in device 12 and will separate from the O ray as shown in FIG. 1. That is, the E ray does not follow Snell's Law and will refract "extraordinarily" at both the entrance and exit of the device. The amount of separation between the O and E rays will therefore be a function of, among other things, the physical length of the walk-off device. The O and E rays that exit first walk-off device 12 are next applied as an input to polarization switch 16.

In accordance with the present invention, polarization switch 16 is formed to exhibit two states. In a first state, switch 16 interchanges the polarizations of signals applied as inputs thereto. In the embodiment discussed thus far in FIG. 1, therefore, the E ray entering switch 16 would be converted to an O ray and, similarly, the entering O ray would exit as an E ray. This first state of polarization switch 16 is depicted by the solid lines exiting polarization switch 16, as shown in FIG. 1. In the alternate, second state of switch 16, the entering E ray would remain as an extraordinary polarized signal and thus exit switch 16 as an E ray (similarly, entering O ray would also exit as an O ray), this second state of switch 16 shown by the dotted lines exiting switch 16. An important aspect of the present invention is that polarization switch 16 is a "reciprocal" device, meaning that the switch will perform the same operation regardless of the propagation direction of signals through the device.

In one embodiment of the present invention, polarization switch 16 may comprise a compound Faraday rotator formed of a pair of 45° rotation devices. The "switching" between states of polarization switch 16 can then be affected by using a first Faraday rotator that maintains a permanent 45° rotation in a given direction—either clockwise or counterclockwise (e.g., latchable garnet), followed by a second 45° rotator, where the direction of rotation within the second rotator is a finction of an externally applied magnetic field. Therefore, the combination of the first and second Faraday rotators will either provide a 90° rotation to the signals (thus converting the polarization states of the orthogonal rays) or a 0° rotation to the signals (i.e., no rotation). Other arrangements for polarization switch 16 are possible and any arrangement capable of switching between providing a 90° rotation and no rotation are considered as falling within the spirit and scope of the present invention. A discussion of alternative arrangements follows hereinbelow in association with FIGS. 5 and 6.

Upon exiting polarization switch 16, as shown in FIG. 1, the two polarized (E and O) optical rays next pass through second walk-off device 14. Presuming that polarization switch 16 is in its first state (i.e., the state where the E ray is converted to an O ray, and the O ray is converted to an E ray), the O ray will pass through second walk-off device 14 unimpeded (according to Snell's Law), while the E ray will be affected by the birefringent material of device 14 and "walk off" as shown in FIG. 1 (since the E ray does not follow Snell's Law and will be deflected when it refracts at the entrance and exit of device 14). In this case, second walk-off device 14 is oriented so that the E ray will walk off toward the O ray and be re-combined with the O ray at the exit face of 14 (presuming walk-off devices 12 and 14 are sized to provide an essentially identical spatial separation between the rays). The recombined O and E rays at the exit of second walk-off device 14 thus form the "pass through" output signal A of optical switch 10 at port 2. In a preferred embodiment, walk-off devices 12 and 14 comprise the same material, orientation and length.

The "reflective" state of optical mirror switch 10 is provided by setting polarization switch 16 in its second state for "maintaining" the polarization state of each ray passing through. That is, as mentioned above, an entering E ray will exit as an E ray and, similarly, an entering O ray will also exit as an O ray. Therefore, as these rays enter second walk-off device 14, the O ray will again propagate through the device unaffected, while the E ray will experience another walk-off—further separating the E ray from the O ray. As shown by the dashed lines in FIG. 1, the E ray exiting second walk-off device 14 will thereafter impinge a first reflective surface 17, which functions to re-direct the E ray back into second walk-off device 14. Similarly, the O ray exiting second walk-off device 14 will impinge a second reflective surface 18 and thereafter be re-directed back into second walk-off device 14. It is to be understood that reflective surfaces 17 and 18 are properly oriented with respect to the E and O rays (that is, with reflective surfaces 17 and 18 perpendicular to the optical axis of each ray) so that each beam will be reflected back onto itself. Since walk-off devices 12,14 and polarization switch 16 are all reciprocal devices, the rays re-entering second walk-off device 14 will follow along the same propagation paths as they did in the forward direction. Therefore, the E and O rays exiting polarization switch 16 (on the left hand side) will pass through first walk-off device 12 such that the E ray "walks off" toward the O ray and thus be re-combined as signal A at port 1.

Figure 2:
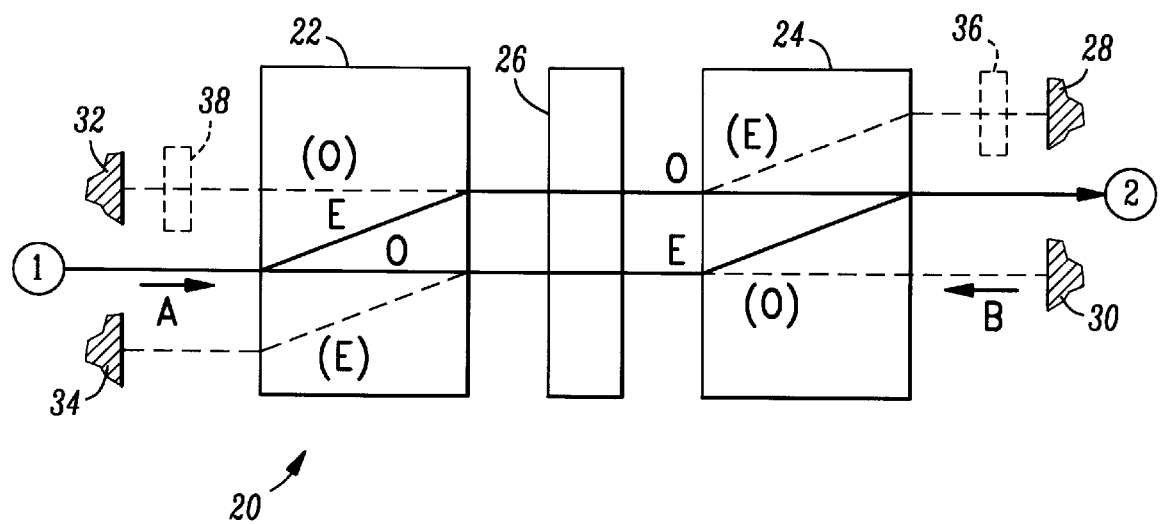
FIG. 2 illustrates an exemplary complete optical mirror switch, also using a pair of walk-off devices, formed in accordance with the present invention.

As mentioned above, optical switch 10 as depicted in FIG. 1 is an "incomplete" optical mirror switch, meaning that only port 1 experiences reflection when the switch is in the "reflective" state; signals applied as an input to port 2 will be "lost" as they propagate through the arrangement of FIG. 1 and therefore not experience the reflective switching function discussed above. While an "incomplete" switch is useful for many situations, there may also be different system arrangements that require a "complete" optical mirror switch; that is, a switch that is capable of reflecting for both ports. FIG. 2 illustrates an exemplary optical switch 20, formed in accordance with the present invention, that is capable of operating as a "complete" mirror optical switch. Referring to FIG. 2, mirror optical switch 20 comprises first and second walk-off devices 22 and 24, with a polarization switch 26 disposed therebetween. A first optical port 1 is used to couple signals into and out of first walk-off device 22 and, similarly, a second optical port 2 is used to couple signals into and out of second walk-off device 24. As with the "incomplete" optical mirror switch 10 discussed above in association with FIG. 1, a first pair of reflective devices 28 and 30 are disposed in the proximity of second optical port 2 and used to re-direct the twice "walked-off" E ray and twice passed O ray back through the switch and into the signal port (optical port 1) of origin (for the "reflective" state of the switch).

In accordance with the "complete" nature of mirror switch 20, a second pair of reflective surfaces, denoted 32 and 34 in FIG. 2, are disposed on either side of signal port 1 and used to reflect signals input at signal port 2 back through switch 20 and back into signal port 2. It is to be noted that in order for the arrangement of FIG. 2 to provide "complete" mirror switching in accordance with the present invention, first walk-off device 22 needs to be sufficiently wide (or tall) so that the dashed line rays can be captured by walk-off device 22, where the separation of the rays is essentially identical to the separation between the rays at the entrance (right hand side) of device 24. This requirement is also needed for the second walk-off device in both the "incomplete" and "complete" versions of the optical mirror switch.

The "forward" operation of mirror switch 20, that is, applying an input signal at port 1 and either having the signal exit at port 2 ("pass through" state of the switch) or be reflected back to port 1 ("reflective" state of the switch) is essentially identical to that described in association with switch 10 of FIG. 1. In order to provide the complete, two-way operation of switch 20, an optical signal applied as an input to signal port 2 will likewise experience a "pass through" state (i.e., be coupled into signal port 1) and a "reflective" state (i.e., be returned through switch 20 and be coupled back into signal port 2)—where this application may be referred to as the "reverse" operation of mirror switch 20. In particular, an optical signal B applied as an input to signal port 2 will first propagate through second walk-off device 24, where signal B will "split" into its orthogonal ordinary (O) and extraordinary (E) polarization ray components, the E ray experiencing "walk off" within the birefringent material forming device 24, as shown in FIG. 2. Thereafter, the O and E rays of optical signal B will be applied as separate inputs to polarization switch 26. If polarization switch 26 is in its first, "exchange" state, the O ray input will be converted to become an E ray and, likewise, the E ray will be converted to become an O ray. This first state is illustrated by the solid lines in FIG. 2. As these rays enter first walk-off device 22, the E ray will "walk off" in the direction shown and, ultimately re-combine with the O ray at the exit of first walk-off device 22 and be coupled into signal port 1. Therefore, when polarization switch 26 is in its first, "exchange" state, optical mirror switch 20 is defined as being in its "pass through" state, allowing optical signal B input at port 2 to exit switch 20 at port 1 (and, similarly, allowing optical signal A input at port 1 to exit switch 20 at port 2).

When polarization switch 26 is in its second, "transmissive" state, the E and O rays propagate through the switch unchanged. Therefore, in the reverse direction (that is, with an optical signal B propagating from the right to the left through the switch), the O ray of signal B will propagate through first walk-off device 22 unimpeded (according to Snell's Law) and impinge reflective surface 32 after exiting device 22. The E ray of signal B will experience further "walk off" as it passes through first walk-off device 22 (since it does not follow Snell's Law), as shown in FIG. 2, and will therefore impinge reflective surface 34 as it exits device 22. As with the "forward" direction discussed above, these reflected signals will propagate back through first walk-off device 22, polarization switch 26 (which remains in its second, "transmissive" state), and second walk-off device 24 such that the rays will re-combine at the output of second walk-off device 24 and be coupled back into optical signal port 2.

In some instances, there may be a desire to correct for sub-optimal performance of an optical mirror switch by virtue of the presence of polarization mode dispersion (PMD) within the switch. In particular, PMD can be defined as a relative delay between the O and E components of an optical signal. If it is desirable to equalize this delay within the arrangement of switch 20 (or switch 10 of FIG. 1), an additional optical path length adjustment component 36 (shown in phantom in FIG. 2) may be inserted in the optical signal path between, for example, second walk-off device 24 and reflective surface 28 (or reflective surface 30). A similar component 38 (illustrated in phantom in FIG. 2) may be inserted in the signal path between first walk-off device 22 and reflective surface 32 (or reflective surface 34). The optical path length adjustment component may simply comprise a transparent plate (for example, glass) that exhibits a different index of refraction than the surrounding material (for example, air). Instead of inserting a physical device in the optical signal path, the relative positioning of reflective surface 28 with respect to reflective surface 30 may be adjusted to equalize the optical signal path lengths. If polarization mode dispersion is not an issue, then reflective surfaces 28 and 30 may be part of a single mirror unit, including a central aperture for the location of optical signal port 2. Similarly, reflective surfaces 32 and 34 may also be formed as part of a single mirror unit including a central aperture for the location of optical signal port 1. In one embodiment, the reflective surfaces may merely comprise metallic coatings or multi-layer thin films deposited upon a nearby surface (such as, for example, a face of a walk-off device).

An optical mirror switch of the present invention may also be formed as a two-stage system, where the two-stage arrangement reduces the number of reflective components from four to one, while still compensating for any PMD that may be present in the system. FIG. 3 illustrates an exemplary two-stage optical mirror switch 40 including a first stage 42 and a second stage 44, with a mirror element 46 and polarization interchanger 48 disposed therebetween. A first port 1 is coupled as an optical signal port to first stage 42, and a second port 2 is coupled as an optical signal port to second stage 44. Polarization interchanger 48, as its name implies, functions to exchange the polarization states of the E and O rays passing therethrough, regardless of the direction of propagation and also regardless of the "state" of switch 40.

The operation of switch 40 in the "pass through" state of applying an input signal at port 1 and having the signal exit at port 2 will first be described. In particular, an optical signal A, coupled to optical port 1, is applied as an input to a first walk-off device 50 of first stage 42. As shown in FIG. 3 and discussed above, the birefringent nature of the walk-off device results in the applied input signal being split into its orthogonal polarization components (denoted as the "O" ray and "E" ray), where the E ray will experience "walk off" relative to the O ray as it passes through the birefringent material of first walk-off device 50. The two spatially separated components are subsequently applied as inputs to a first polarization switch 52. In the two-stage embodiment of FIG. 3, first polarization switch 52 will be in its second, "transmissive" state to allow for optical signal A to "pass through" from port 1 to port 2. In this embodiment, the E and O rays of optical signal A will maintain their respective polarization states as they propagate through first polarization switch 52. The separate E and O rays are then applied as inputs to a second walk-off device 54. As shown in FIG. 3, second walk-off device 54 is oriented so that the E ray experiences a second walk-off in the same direction, further separating the E and O rays as they exit second walk-off device 54, where the output from second walk-off device 54 can be defined as the output from first stage 42 of two-stage optical switch 40.

Since the E and O rays are relatively widely spaced, they will pass on either side of mirror element 46, as shown in FIG. 3. Thereafter, the E and O rays are applied as inputs to polarization interchanger 56. As mentioned above, polarization interchanger functions to "exchange" the polarization states of the signals passing therethrough, regardless of the state of switch. Therefore, the rays of signal A emerge from polarization interchange 56 with the "top" ray being the O ray and the "bottom" ray being the E ray. These two rays are subsequently applied as separate inputs to second stage 44 of mirror switch 40 and, in particular, applied as separate inputs to a third walk-off device 58. As shown in FIG. 3, third walk-off device 58 is oriented so that the E ray "walks off" toward the O ray, thus decreasing the relative separation between the two rays. Upon exiting third walk-off device 58, the O and E rays of signal A are applied as inputs to a second polarization switch 60. As with first polarization switch 52, second polarization switch 60 is held in its second, "transmissive" mode when two-stage optical mirror switch 40 is in its "pass through" state. Therefore, the applied O ray exits second polarization switch 60 as an O ray and the applied E ray exits second polarization switch 60 as an E ray. These rays are then applied as separate inputs to a fourth walk-off device 62, which is oriented to cause the E ray to "walk off" toward the O ray, as shown in FIG. 3. Therefore, the O and E rays will re-combine at the output of fourth walk-off device 62 and thereafter be coupled as the output signal into optical port 2.

As shown in FIG. 3, two-stage optical mirror switch 40 is a "complete" mirror switch, capable of providing switching in both directions. That is, an optical signal B applied as an input to signal port 2 of switch 40 will also "pass through" both stages of the switch (as long as first and second polarization switches 52,60 are held in their second, "transmissive" state) and ultimately be coupled into signal port 1.

In the "reflective" state of two-stage optical mirror switch 40, both first polarization switch 52 and second polarization switch 60 are reconfigured into their first, "exchange" state such that any O ray entering either switch is converted into an E ray, and any E ray entering either switch is converted into an O ray. In this state, optical signal A coupled to optical signal port 1 will still be split into separate E and O rays as the signal propagates through first walk-off device 50. However, as the separate rays pass through polarization switch 52, the E ray will be converted to an O ray and, similarly, the O ray will be converted to an E ray. These two rays, indicated in parentheses at the output of first polarization switch 52, are subsequently applied as separate inputs to second walk-off device 54. As shown by the dotted lines in FIG. 3, the applied E ray, as a result of the orientation of second walk-off device 54, will "walk off" toward the O ray and will combine with the O ray at the output of second walk-off device 54. Reflective element 46 is disposed at the output of second walk-off device 54 (also referred to as the output of first stage 42) so as to intercept the re-combined O and E rays exiting device 54, as shown by the dotted lines in FIG. 3. Therefore, the re-combined O and E rays will be completely reflected and re-enter second walk-off device 54 as an input. Since each walk-off device is reciprocal, second walk-off device 54 will function to split the two rays, where the E ray will "walk off" and separate from the O ray (again, indicated by the dotted lines in FIG. 3). First polarization switch 52 will again exchange the polarization state of the two rays, allowing for the rays exiting switch 52 to be re-combined as they pass through first walk-off device 50 and thereafter coupled back into optical signal port 1.

An optical signal B applied as an input to signal port 2 when two-stage optical mirror switch is in its "reflective" state will be similarly redirected by reflective element 46 back through the components forming second stage 44 so as to thereafter be coupled back into signal port 2. Since these rays will pass through polarization interchanger 56 twice, the signals exiting interchanger 56 after the second pass will be in their original polarization state, thus not affecting the signal paths followed through the various elements of second stage 44 of optical mirror switch 40. An alternative embodiment of reflective element 46 and polarization interchanger 56 may be formed by "splitting" the interchanger into two separate elements (each performing half of the polarization interchange), with reflective element disposed therebetween. In this alternative embodiment, incident O and E rays will be reflected as E and O rays, respectively.

It is possible for an exemplary "walk off assembly" (e.g., a single stage of a multiple stage switch) to exhibit orientations other than those described above. FIG. 4 illustrates an exemplary alternative configuration for the first stage 42 of mirror switch 40 of FIG. 3. As shown in FIG. 4, first walk-off device and polarization switch 52 are essentially identical to those components described above. In contrast, however, second walk-off device 54' has been rotated 180° when compared to second walk-off device 54 of FIG. 3. Therefore, as shown in FIG. 4, the E ray exiting polarization switch 52 (the solid line) will "walk off" toward the O ray (in contrast to the above arrangement where the rays further separated as they passed through the second walk-off device). In order to allow both the E and O rays to "pass through" to output port 2, mirror 46 of FIG. 3 is replaced by a pair of mirror elements 64 and 66, disposed to intercept the separated O and E rays; allowing the combined rays to continue to propagate unimpeded. As with the arrangements described above, mirror elements 64 and 66 may comprise a single reflective element, containing a central aperture that allows for the combined rays to pass through. In one embodiment, the reflective surfaces may merely comprise metallic coatings or multi-layer thin films deposited upon a nearby surface (such as, for example, a face of a walk-off device).

Figure 5A:
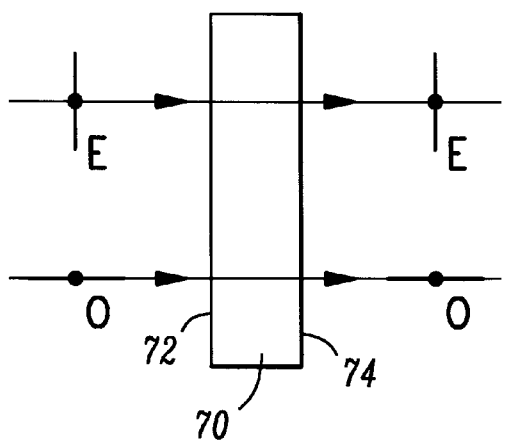
FIGS. 5A–5D illustrate, in side and front views, an exemplary half-wave plate that may be used as a "polarization switch" in the arrangement of FIG. 2.
Figure 5B:
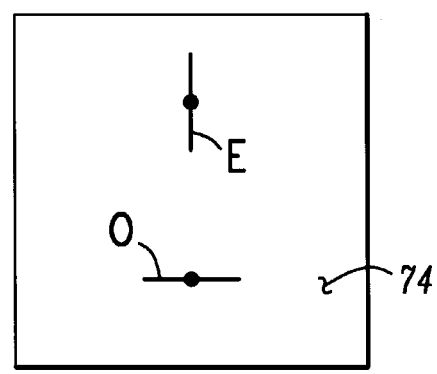
Figure 5C:
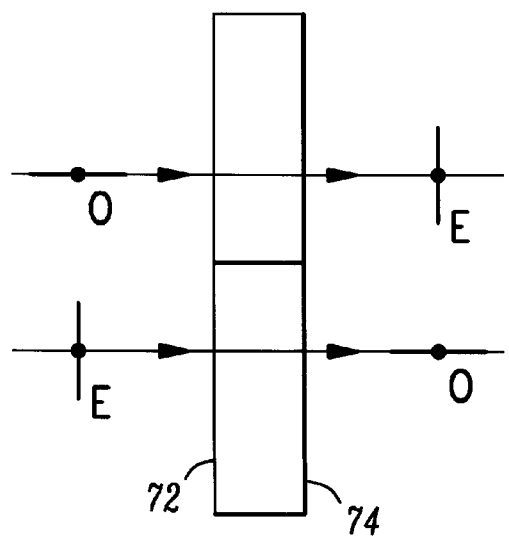
Figure 5D:
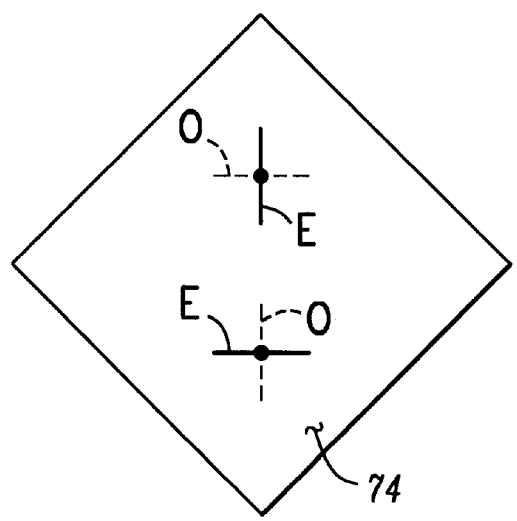
Figure 6A:
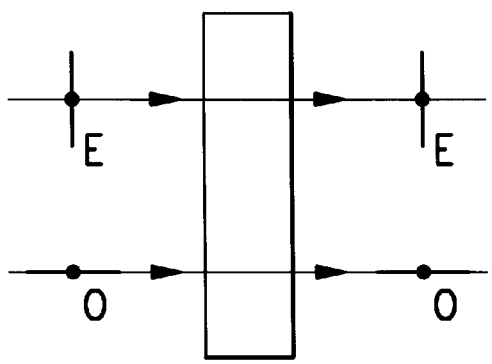
FIGS. 6A–6D illustrated, in side and front views, an exemplary transparent medium (such as glass, plastic, nitrobenzene, for example) that may be used as a "polarization switch" in the arrangement of FIG. 2.
Figure 6B:
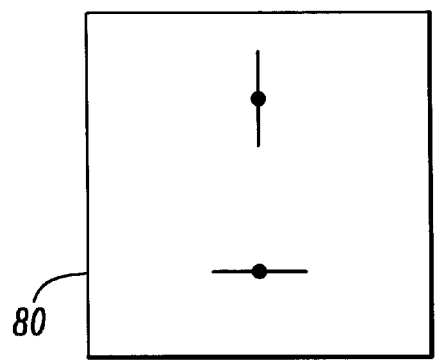
Figure 6C:
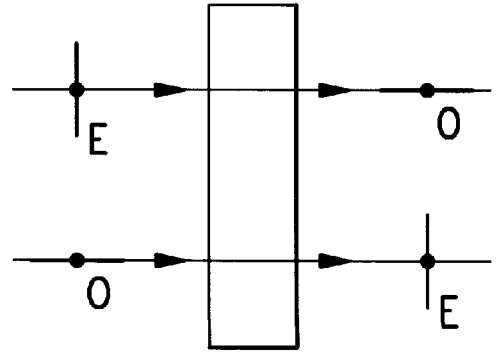
Figure 6D:
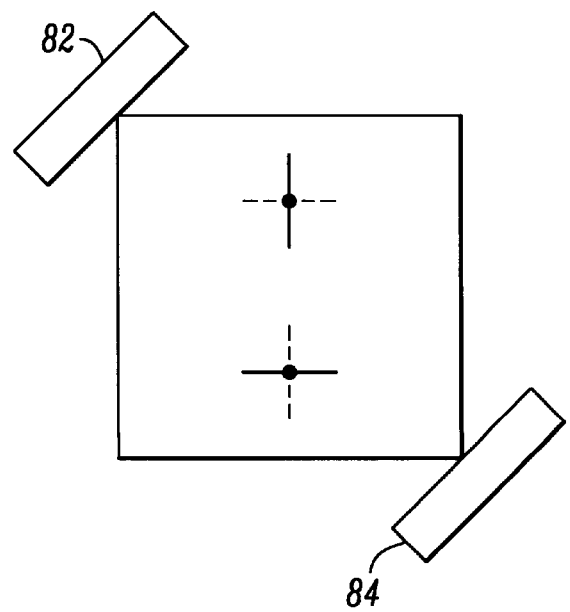

As mentioned above, there are various arrangements that may be used to form the polarization interchanger component of the present invention. FIG. 5 illustrates an exemplary polarization interchange 70 formed from a half-wave plate that is rotated 90° to provide for the change between the "polarization unaffected" state to the "polarization interchanged state". FIG. 5A contains a side view of half-wave plate 70, illustrating separate E and O rays entering through face 72 of half-wave plate 70. The orientation of half-wave plate 70 is best shown in FIG. 5B. With this particular orientation, the polarization of the rays is aligned with the slow/fast axes of the device and, therefore, will not have their polarization changed as they exit at face 74, as shown in FIG. 5A. When it is desired to have the polarization interchanger operate in the "exchange" state, half-wave plate 70 is rotated ±45° (or ±135°), as indicated by the arrow in FIG. 5B (compare FIG. 5B and FIG. 5D). This rotation of plate 70 results in the linearly polarized O and E rays entering half-wave plate 70 at 45° with respect to the slow/fast axis. Therefore, as shown in FIG. 5C, an E ray entering at face 72 of half-wave plate 70 will be converted into an O ray as it exits face 74 and, similarly an O ray entering at face 72 of half-wave plate 70 will be converted into an E ray as it exits face 74.

FIG. 6 illustrates an exemplary transparent medium 80 (for example, glass, plastic, nitrobenzene) that is also suitable for using as a polarization interchanger. In this arrangement, transparent medium 80, if left undisturbed, will allow for the polarized O and E rays to pass through unaffected, as shown in FIGS. 6A and 6B. However, if a "stress" is applied to medium 80 (the stress being, for example, a mechanical stress or an applied electric field, generally illustrated as elements 82,84 in FIGS. 6C and 6D), medium 80 can display polarization anisotropy sufficient to convert the polarization state of the signals passing through.

It is to be understood that other possible rotations between walk-off device elements are possible. For example, the components could be oriented at an angle of 90° to each other. In general, the mirror switch arrangement of the present invention is limited only by the spirit and scope of the claims appended hereto.

What is claimed is:

1. An optical mirror switch assembly including a first signal port and a second signal port, the switch defined as exhibiting a first, "pass through" state when an optical signal applied as an input at said first port passes through said switch and exits at said second port and exhibiting a second, "reflective" state when an optical signal applied as an input at said first port is reflected by said switch back into said first port, said optical mirror switch comprising a first walk-off device coupled to said first signal port, wherein an optical signal applied as an input to said first port is split by said first walk-off device into spatially separated orthogonally polarized components, defined as an O ray and an E ray, so as to exit said device at a pair of separate component ports, said first walk-off device being reciprocal such that a pair of orthogonal rays coupled to said pair of separate component ports will be combined by said first walk-off device and be coupled into said first signal port;

a second walk-off device coupled to said second signal port, wherein an optical signal applied as an input to said second port will be split by said second walk-off device into spatially separated orthogonally polarized components, defined as an O ray and an E ray, so as to exit said second walk-off device at a pair of separate component ports, said second walk-off device being reciprocal such that a pair of orthogonal rays coupled to said pair of separate component ports will be combined by said second walk-off device and be coupled into said second signal port;

a polarization switch having first and second states, a first state defined as exchanging an input E ray into an output O ray and exchanging an input O ray into an output E ray, and a second state defined as maintaining an input E ray as an output E ray and maintaining an input O ray as an output O ray, said polarization switch disposed between the first and second walk-off devices and coupled to the pair of component ports of both devices; and a reflective device disposed beyond said second walk-off device and positioned to intercept separated E and O rays exiting said second walk-off device and re-direct said rays back through said switch and into the first signal port.

2. An optical mirror switch as defined in claim 1 wherein the polarization switch comprises a first Faraday rotator fixed to provide a 45° rotation in a first direction; and a second Faraday rotator, disposed in series with said first Faraday rotator and configured to provide a 45° rotation in the same direction as said first Faraday rotator for the first state of said polarization switch and provide a 45° rotation in the opposite direction from said first Faraday rotator for the second state of said polarization switch.

3. An optical mirror switch as defined in claim 1 wherein the switch further comprises a polarization mode dispersion correction component disposed in a signal path between the second walk-off device and the reflective device to equalize the optical path lengths through said switch for the O and E rays.

4. An optical mirror switch as defined in claim 3 wherein the polarization mode dispersion correction component comprises a glass plate of a predetermined thickness.

5. An optical mirror switch as defined in claim 1 wherein the location of the reflective device with respect to the second walk-off device is adjusted to equalize the optical signal path lengths for the E and O rays.

6. An optical mirror switch as defined in claim 1 wherein the switch further comprises a second reflective device disposed beyond the first walk-off device and positioned to intercept separated E and O rays exiting said first walk-off device and re-direct said rays back through said switch and into the second signal port.

7. A two-stage optical mirror switch including a first signal port and a second signal port, the switch defined as exhibiting a first, "pass through" state when an optical signal applied as an input at said first port will pass through said switch and exit at said second port and exhibiting a second, "reflective" state when an optical signal applied as an input at said first port will be reflected by said switch back into said first port, each stage comprising a first walk-off device coupled to said first signal port, wherein an optical signal applied as an input to said first port is split by said first walk-off device into spatially separated orthogonally polarized components, defined as an O ray and an E ray, so as to exit said device at a pair of separate component ports, said first walk-off device being reciprocal such that a pair of orthogonal rays coupled to said pair of separate component ports will be combined by said first walk-off device and be coupled into said first signal port;

a second walk-off device coupled to said second signal port, wherein an optical signal applied as an input to said second port is split by said second walk-off device into spatially separated orthogonally polarized components, defined as an O ray and an E ray, so as to exit said second walk-off device at a pair of separate component ports, said device being reciprocal such that a pair of orthogonal rays coupled to said pair of separate component ports will be combined by said second walk-off device and be coupled into said second signal port; and a polarization switch having first and second states, a first state defined as exchanging an input E ray into an output O ray and exchanging an input O ray into an output E ray, and a second state defined as maintaining an input E ray as an output E ray and maintaining an input O ray as an output O ray, said polarization switch disposed between the first and second walk-off devices and coupled to the pair of component ports of both devices;

the two-stage optical mirror switch further comprising a reflective arrangement disposed between said first and second stages in a position to intercept optical signals applied as an input at the first port of the first stage and the second port of the second stage, and redirect said optical signals back into the originating port for the reflective state of said switch; and a polarization interchanger, said polarization interchanger functioning to convert an applied E ray into an O ray and an applied O ray into an E ray, regardless of the state of said two-stage switch, said polarization interchanger disposed to intercept separated E and O rays exiting said second walk-off device and direct said rays into said first walk-off device.

8. An optical mirror switch as defined in claim 7 wherein at least one polarization switch comprises a first Faraday rotator fixed to provide a 45° rotation in a first direction; and a second Faraday rotator, disposed in series with said first Faraday rotator and configured to provide a 45° rotation in the same direction as said first Faraday rotator for the first state of said polarization switch and provide a 45° rotation in the opposite direction from said first Faraday rotator for the second state of said polarization switch.

* * * * *